US012051217B2

(12) United States Patent
Kansai

(10) Patent No.: US 12,051,217 B2
(45) Date of Patent: Jul. 30, 2024

(54) IMAGE PROCESSING APPARATUS, IMAGE PROCESSING SYSTEM, AND CONTROL METHOD

(71) Applicant: TOSHIBA TEC KABUSHIKI KAISHA, Tokyo (JP)

(72) Inventor: Kenta Kansai, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 396 days.

(21) Appl. No.: 17/381,643

(22) Filed: Jul. 21, 2021

(65) Prior Publication Data

US 2022/0101550 A1 Mar. 31, 2022

(30) Foreign Application Priority Data

Sep. 25, 2020 (JP) .................................. 2020-160709

(51) Int. Cl.
*G06T 7/70* (2017.01)
*G06Q 10/087* (2023.01)
*G06T 7/90* (2017.01)
*G06V 20/52* (2022.01)

(52) U.S. Cl.
CPC .............. *G06T 7/70* (2017.01); *G06Q 10/087* (2013.01); *G06T 7/90* (2017.01); *G06V 20/52* (2022.01); *G06T 2207/30242* (2013.01)

(58) Field of Classification Search
CPC ... G06T 7/70; G06T 7/90; G06T 2207/30242; G06Q 10/087; G06V 20/52; G06V 10/56
USPC ......................................................... 382/154
See application file for complete search history.

(56) References Cited

U.S. PATENT DOCUMENTS

| 9,811,754 | B2 | 11/2017 | Schwartz |
| 10,445,693 | B2 | 10/2019 | Takemoto |
| 10,824,990 | B2 | 11/2020 | Wang |
| 2004/0181467 | A1* | 9/2004 | Raiyani ................ G06Q 10/087 705/28 |

(Continued)

FOREIGN PATENT DOCUMENTS

| JP | H0581552 A | 4/1993 |
| JP | 2000281204 A | 10/2000 |

(Continued)

OTHER PUBLICATIONS

Japanese Office Action dated Apr. 9, 2024, mailed in counterpart Japanese Application No. 2020-160709, 8 pages (with translation).

*Primary Examiner* — Ali Bayat
(74) *Attorney, Agent, or Firm* — Kim & Stewart LLP

(57) ABSTRACT

According to one embodiment, an image processing apparatus includes a camera controller to acquire a camera image of a display location where commodities are displayed. A communication interface is provided to communicate with an information terminal. A processor in the apparatus is configured to calculate an empty area in the camera image corresponding to a portion of the display location that is revealed when commodities are removed from the display location, detect a shortage in the number of the commodities at the display location based on the calculated empty area, and send a notification, via the communication interface, to the information terminal when the shortage in the number of the commodities at the display location is detected.

20 Claims, 5 Drawing Sheets

(56) References Cited

U.S. PATENT DOCUMENTS

| | | | |
|---|---|---|---|
| 2005/0262017 A1* | 11/2005 | Kawase | G06Q 20/18 |
| | | | 705/40 |
| 2008/0077511 A1* | 3/2008 | Zimmerman | G06Q 10/087 |
| | | | 705/28 |
| 2015/0262116 A1 | 9/2015 | Katircioglu | |
| 2017/0255899 A1 | 9/2017 | Taira et al. | |
| 2017/0300938 A1* | 10/2017 | Sakata | G06F 18/22 |
| 2019/0325379 A1* | 10/2019 | Medina | G06V 20/20 |
| 2020/0234227 A1* | 7/2020 | Gadou | G06F 16/583 |
| 2021/0012272 A1* | 1/2021 | Dugar | G06T 7/0008 |

FOREIGN PATENT DOCUMENTS

| | | | |
|---|---|---|---|
| JP | 2015060674 A | 3/2015 | |
| JP | 2016057952 A | 4/2016 | |
| JP | 2016115349 A | 6/2016 | |
| JP | 2019079322 A | 5/2019 | |
| JP | 2019152934 A | 9/2019 | |

* cited by examiner

IMAGE PROCESSING APPARATUS, IMAGE PROCESSING SYSTEM, AND CONTROL METHOD

CROSS-REFERENCE TO RELATED APPLICATION

This application is based upon and claims the benefit of priority from Japanese Patent Application No. 2020-160709, filed Sep. 25, 2020, the entire contents of which are incorporated herein by reference.

FIELD

An embodiment described herein relates generally to an image processing apparatus, an image processing system, and a control method for an image processing apparatus or system.

BACKGROUND

In stores such as supermarkets, display tables, display shelves and the like (display locations) for displaying fresh commodities are disposed. In a related art, a store clerk looks around the display locations, checks fora shortage of commodities, and restocks the commodities at the display locations as necessary. However, the work of displaying commodities at the display locations imposes a heavy work burden on the clerk, and the clerk may overlook or miss a shortage of commodities. Therefore, a technique for efficiently detecting a shortage of commodities at a display location has been desired.

DETAILED DESCRIPTION

An object to be solved by the embodiment of the present disclosure is to provide an image processing apparatus, an image processing system, and a control method thereof that are capable of efficiently detecting a shortage of items at a display location.

In general, according to one embodiment, an image processing apparatus includes a camera controller to acquire a camera image of a display location, such as a display table or the like, where commodities are displayed. A communication interface is provided for communication with an information terminal. A processor of the apparatus is configured to calculate an empty area in the camera image corresponding to a portion of the display location that is revealed when commodities are removed from the display location, detect a shortage in the number of the commodities at the display location based on the calculated empty area, and send a notification, via the communication interface, to the information terminal when the shortage in the number of the commodities at the display location is detected.

Hereinafter, certain example embodiments of an image processing apparatus and an image processing system will be described with reference to drawings.

Figure 1:
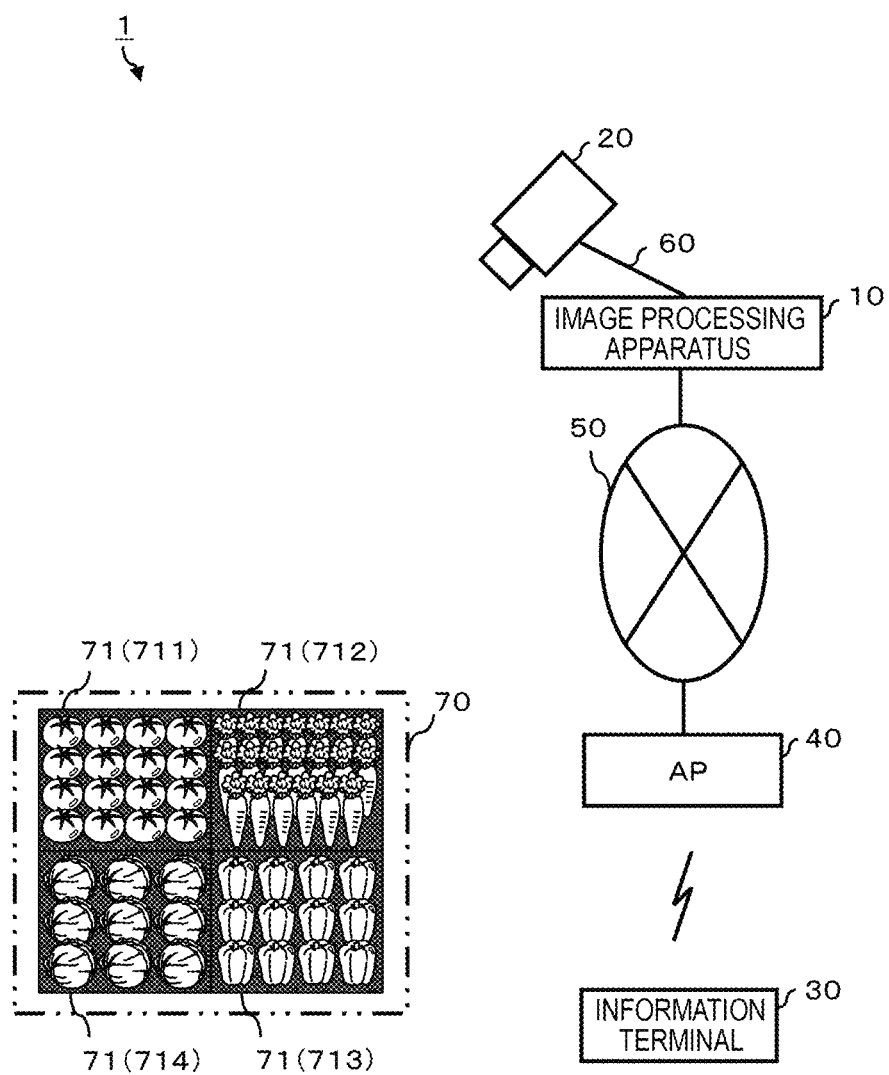
FIG. 1 is a schematic diagram of an image processing system according to an embodiment.

In the present disclosure, as illustrated in FIG. 1, a scenario involving the determination of a shortage of commodities placed on a display table 70 for displaying commodities will be explained as an example. The display table 70 is installed in a retail store such as a grocery store or produce market. Here, the commodities are fresh commodities such as vegetables and fruits. On the display table 70, different types of fresh commodities may be displayed in each section 71 (four different sections 71 are illustrated as an example).

FIG. 1 is a schematic diagram of an image processing system 1. The image processing system 1 includes an image processing apparatus 10, a camera 20, an information terminal 30, and an access point 40. The camera 20 is connected to the image processing apparatus 10 by a dedicated communication cable 60 or camera interface. In other examples, camera 20 may be connected to the image processing apparatus 10 by wireless communication. Alternatively, the camera 20 may be incorporated in the image processing apparatus 10. The information terminal 30 is an electronic apparatus including an input device and a display device. The information terminal 30 enables wireless communication with the access point 40. The information terminal 30 connected to the access point 40 by wireless communication can perform data communication with the image processing apparatus 10 via a communication network 50. The communication network 50 connects the image processing apparatus 10 and the information terminal 30 via a wired or wireless connection. For example, a local area network (LAN) is used as the communication network 50.

As illustrated in FIG. 1, the camera 20 is installed (positioned) to face the display table 70. The installation height of the camera 20, the distance from the camera 20 to the display table 70, the angle of view (field of view) of the camera 20, and the like are set so that the entire display table 70 is within the imaging range of the camera 20. The camera 20 is, for example, a digital video camera.

Figure 2:
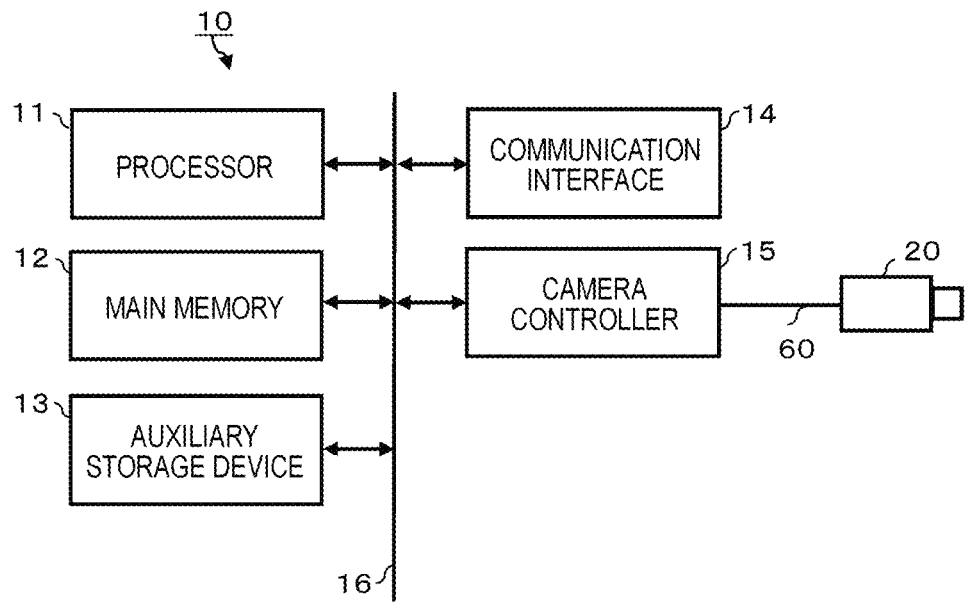
FIG. 2 is a block diagram of an image processing apparatus.

FIG. 2 is a block diagram illustrating a hardware configuration of the image processing apparatus 10. The image processing apparatus 10 includes a processor 11, a main memory 12, an auxiliary storage device 13, a communication interface 14, a camera controller 15, and a system transmission line 16. The processor 11, the main memory 12, the auxiliary storage device 13, the communication interface 14, and the camera controller 15 are directly or indirectly connected by the system transmission line 16 which may incorporate an address bus, a data bus, a control signal line, and the like. The image processing apparatus 10 is a computer with the processor 11, the main memory 12, the auxiliary storage device 13, and the system transmission line 16.

The processor 11 corresponds to the central processor of a computer. The processor 11 controls each sub-unit of the image processing apparatus 10 in order to realize various described functions of the image processing apparatus 10. The processor 11 may operate in conjunction with an operating system and an application program executing on the processor 11. The processor 11 is, for example, a central processing unit (CPU).

The main memory 12 includes a non-volatile memory area and a volatile memory area. The main memory 12 stores the operating system and/or application program in the non-volatile memory area. The main memory 12 may store data in the non-volatile or volatile memory area as necessary for the processor 11 to execute processing for controlling each sub-unit. The main memory 12 provides the volatile memory area as a work area where data can be written and rewritten by the processor 11. The non-volatile memory area is, for example, a read only memory (ROM). The volatile memory area is, for example, a random access memory (RAM). An image memory is in a part of the work area. Image data captured by the camera 20 are sequentially written to the image memory.

The auxiliary storage device 13 is, for example, electric erasable programmable read-only memory (EEPROM®), a hard disk drive (HDD), solid-state drive (SSD), or the like. The auxiliary storage device 13 stores data used by the processor 11 to perform various kinds of processing and the data generated by the processing of the processor 11. The auxiliary storage device 13 may also store the application program.

The application program stored in the main memory 12 or the auxiliary storage device 13 includes a control program with program instructions for the information processing executed by the image processing apparatus 10. The method of installing the control program in the main memory 12 or the auxiliary storage device 13 is not particularly limited. The control program can be recorded on a removable recording medium, or the control program can be distributed by communication via a network and then installed in the main memory 12 or the auxiliary storage device 13. The recording medium may be in any form such as a CD-ROM or a memory card as long as the medium can store a program and can be read by the apparatus.

The communication interface 14 is connected to the communication network 50. The communication interface 14 communicates data with other devices connected via the communication network 50 according to a communication protocol.

The camera controller 15 controls the capture on/off state of the camera 20 connected via the communication cable 60. Then, the camera controller 15 collects, via the communication cable 60, the image(s) captured by the camera 20.

Figure 3:
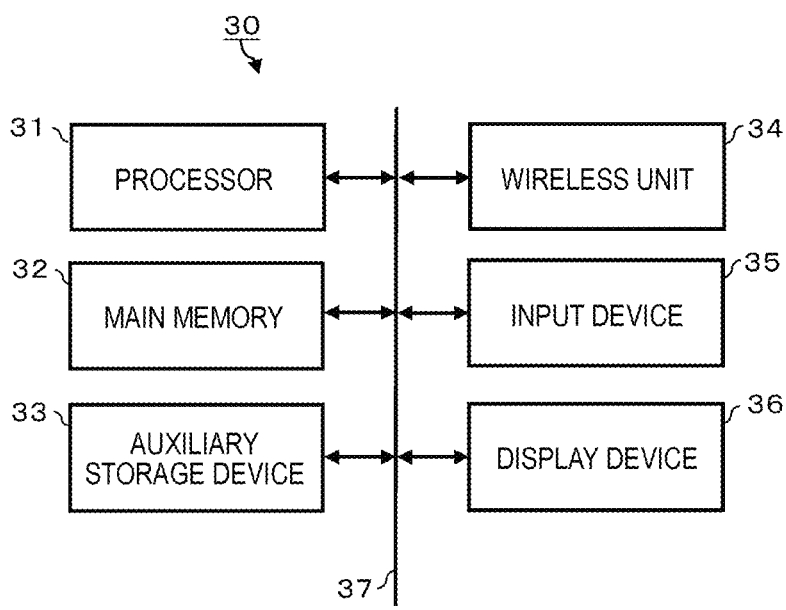
FIG. 3 is a block diagram of an information terminal.

FIG. 3 is a block diagram illustrating hardware aspects of the information terminal 30. The information terminal 30 includes a processor 31, a main memory 32, an auxiliary storage device 33, a wireless unit 34, an input device 35, a display device 36, and a system transmission line 37. The system transmission line 37 may incorporate an address bus, a data bus, a control signal line, and the like. In the information terminal 30, the processor 31, the main memory 32, the auxiliary storage device 33, the wireless unit 34, the input device 35, and the display device 36 are connected to the system transmission line 37. The information terminal 30 includes the processor 31, the main memory 32, the auxiliary storage device 33, and the system transmission line 37 connecting therebetween.

The processor 31 corresponds to the central processor of a computer. The processor 31 controls each sub-unit in order to realize various described functions of the information terminal 30 in conjunction with an operating system and/or application program. The processor 31 is, for example, a CPU.

The main memory 32 includes a non-volatile memory area and a volatile memory area. The main memory 32 stores an operating system and/or an application program in the non-volatile memory area. The main memory 32 may store data necessary for the processor to execute processing for controlling each unit in the non-volatile or volatile memory area. A volatile memory area of the main memory 32 is used as a work area where data can be written and rewritten by the processor 31. The non-volatile memory area is, for example, a ROM. The volatile memory area is, for example, RAM.

The auxiliary storage apparatus 33 is, for example, an EEPROM, a HDD, a SSD, or the like. The auxiliary storage device 33 stores data used by the processor 31 to perform various kinds of processing and the data created by the processing of the processor 31. The auxiliary storage device 33 may store an application program.

The wireless unit 34 wirelessly communicates data with the access point 40 according to a wireless communication protocol.

The input device 35 is capable of sending data or user instructions to the information terminal 30. For example, the input device 35 is a keyboard, a touch panel, or the like.

The display device 36 is capable of displaying various screens under the control of the processor 21. For example, the display device 36 is a liquid crystal display, an electroluminescence (EL) display, a plasma display, or the like.

Figure 4:
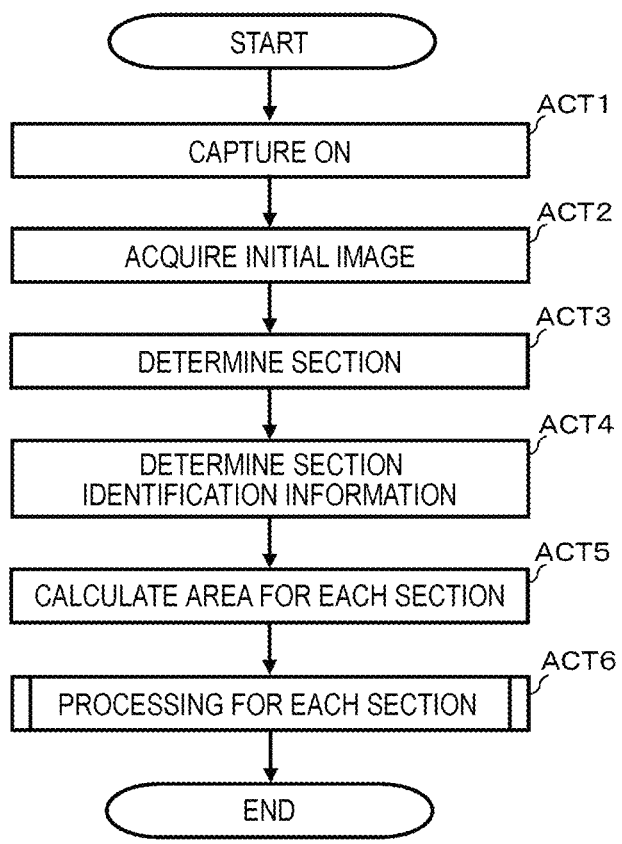
FIG. 4 is a flowchart illustrating aspects of a control procedure of a processor in an image processing apparatus.
Figure 5:
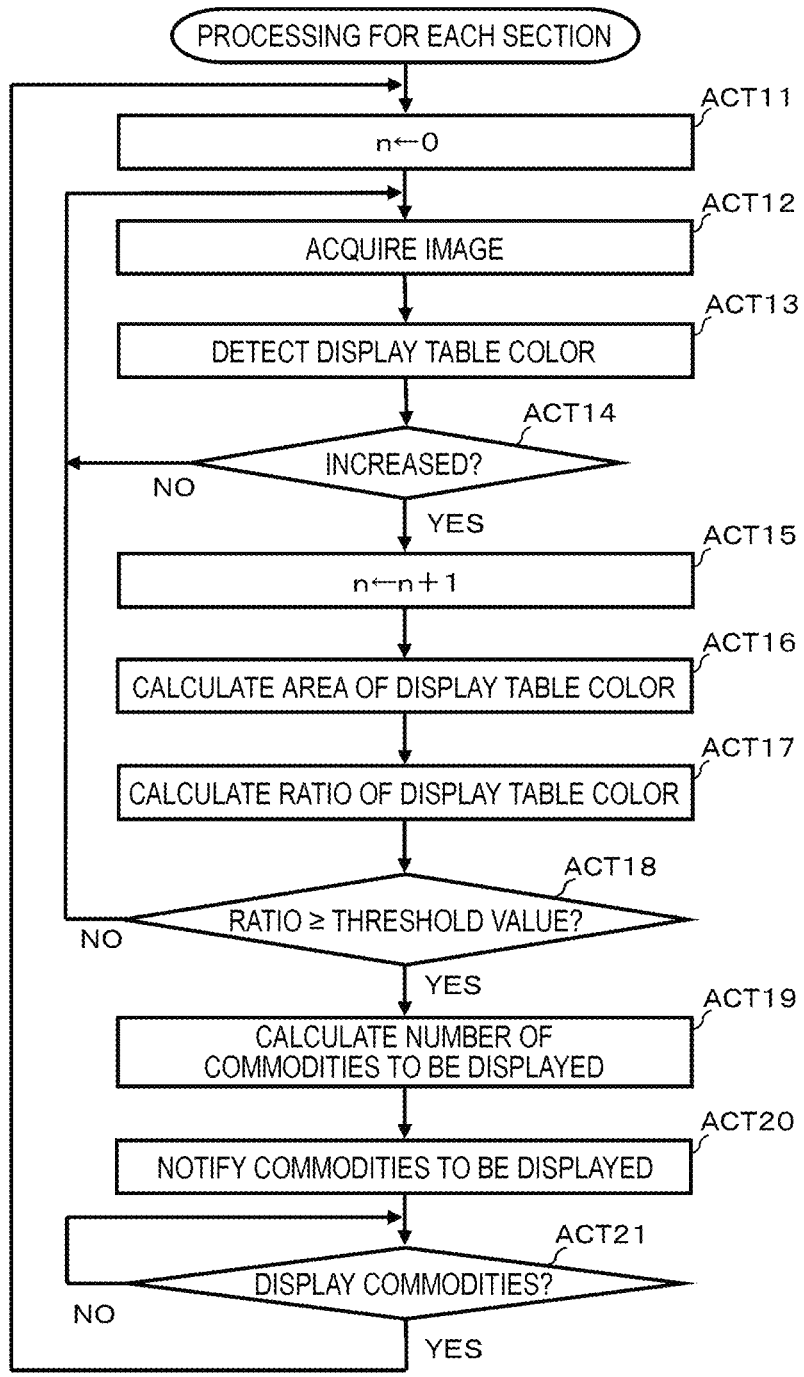
FIG. 5 is a flowchart illustrating aspects of a control procedure of a processor in an image processing apparatus.

FIGS. 4 and 5 are flowcharts illustrating aspects of the information processing executed by the processor 11 of the image processing apparatus 10 according to the control program. Hereinafter, an operation of the image processing system 1 will be described with reference to these flowcharts. The specifics of the procedure and the contents of the operation described below are non-limiting examples, and as long as similar results can be obtained, the procedure and contents of such operations are not limited.

First, a store clerk restocks the display table 70 with fresh commodities, as illustrated in the display table 70 in FIG. 1. That is, the clerk covers the surface of the display table 70 with the display of fresh commodities such that the display table is fully stocked. If the control program of the image processing apparatus 10 is activate here, the processor 11 of the image processing apparatus 10 starts the information processing according to the procedure illustrated in the flowcharts of FIGS. 4 and 5.

The processor 11 notifies the camera controller 15 to control the camera 20 to begin capture of images ("capture on") as ACT 1. Once the camera controller 15 receives the notification from the processor 11, the camera controller 15 controls the camera 20 to begin capturing images. Therefore, the camera 20 captures an image of the display table 70.

The processor 11 notifies the camera controller 15 to acquire an initial image from the camera 20 as ACT 2. The initial image in this example is an image of the display table 70 in a fully restocked state, that is, with fresh commodities covering the surface of the display table 70. Once the camera controller 15 receives the notification, the camera controller 15 acquires the initial image that was captured by the camera 20. Once the initial image is captured, the camera controller 15 writes the image data to the image memory of the main memory 12.

As ACT 3, the processor 11 determines the positioning/arrangement of the sections 71 (in this example, sections 711, 712, 713, 714) based on the image data that was stored in the image memory. The sections 71 (sections 711 to 714) are each a region occupied by one type of the fresh commodities of the commodities displayed on the display table 70 as illustrated in FIG. 1. In some example, a part of one section 71 can overlap another adjacent section 71. As a method of determining the locations of the sections 71 on the display table 70, color information can be detected for each pixel in the image data. Then, a group of pixels for which similar color information is detected may be identified as corresponding to one section 71 for one fresh commodity type. Since the technique for determining a section based on such color information is well known, detailed description thereof will be omitted.

The processor 11 determines section identification information as ACT 4. The section identification information is for identifying each section 71 (sections 711 to 714). The section identification information is, for example, information in which the upper left section 711 is designated "A", the upper right section 712 is designated "B", the lower right section 713 is designated "C", and the lower left section 714 is designated "D" when viewed from the front of the display table 70. The section identification information may be two-dimensional coordinate data or the like including an X-axis and a Y-axis. In general, any information that allows the clerk to identify the particular sections 71 (sections 711 to 714) is sufficient.

As ACT 5, the processor 11 calculates the area for each section 71 (sections 711 to 714). The processor 11 then executes section processing as ACT 6. That is, the processor 11 executes processing for each section 71 (sections 711 to 714).

The procedure of the processing for each section 71 is illustrated more particularly by the flowchart of FIG. 5. As depicted in FIG. 5, the processor 11 sets a count value n to "0" as ACT 11. The processor 11 acquires the area of the particular section 71 as ACT 12. The processor 11 detects the display table color as ACT 13. The display table color is the color of the surface of the display table 70 that is exposed to the camera 20. The image processing apparatus 10 stores the color information of the display table color in the auxiliary storage device 13. In the present embodiment, detecting the display table color means that the display table color is exposed and the color becomes apparent when some fresh commodities are removed from the display table 70.

As ACT 14, the processor 11 confirms whether the amount of the display table color in the section 71 has increased. In the present embodiment, an increase in the display table color means that the detected incidence of the display table color increases beyond a certain amount. The certain amount in this context is the minimum value of the display table surface area would be revealed in an image from camera 20 if one fresh commodity item displayed on the display table 70 was removed. If the amount of the display table color did not increase, the processor 11 determines NO in ACT 14 and returns to ACT 12.

If the display table color amount increased, the processor 11 determines YES in ACT 14 and proceeds to ACT 15. The processor 11 increases (increments) the count value n by "1" in ACT 15.

Figure 6:
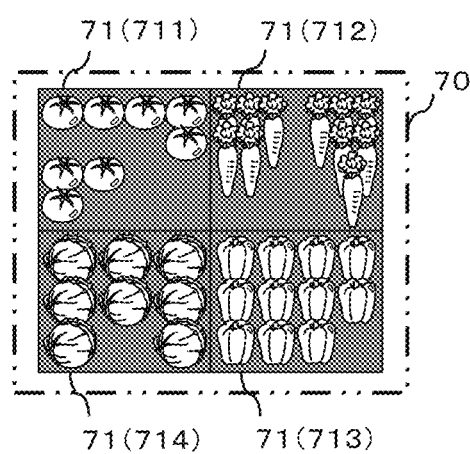
FIG. 6 is a schematic diagram illustrating an example of a display table from which fresh commodities have been removed.

The processor 11 calculates the area of the detected display table color amount as ACT 16. FIG. 6 is a schematic diagram illustrating an example of a state in which various fresh commodities have been removed from the display table 70. As illustrated in FIG. 6, when fresh commodities are removed from each section 71 (sections 711 to 714), the display table color of the display table 70 surface is exposed and becomes apparent in the images from camera 20. In FIG. 6, the display table color is gray. The processor 11 calculates the area of the part where the gray color is shown.

Referring back to FIG. 5, as ACT 17, the processor 11 calculates the ratio of the area of the display table color calculated in ACT 16 to the area of each section 71 (sections 711 to 714) calculated in ACTS of FIG. 4.

The processor 11 confirms whether the ratio is equal to or higher than a predetermined threshold value as ACT 18. The threshold value is, for example, a value for determining whether the exposed area of the display table color has reached a level considered to correspond to a shortage of commodities on the display 70. In general, the setting of the threshold value is arbitrary. The threshold value may be a fixed value set in the image processing apparatus 10, or may be changed to any desired value by a person who manages the image processing apparatus 10. If the ratio does not exceed the predetermined threshold value, the processor 11 determines NO in ACT 18 and returns to ACT 12. That is, the processor 11 repeatedly executes the above-described processing of ACT 12 to ACT 18 until the ratio becomes equal to or higher than the predetermined threshold value.

If the processor 11 performs the processing of ACT 12 to ACT 18 and the ratio becomes reaches or exceeds the predetermined threshold value, the processor 11 determines YES in ACT 18 and proceeds to ACT 19. The processor 11 calculates the number of commodities to be displayed on the display table 70 as ACT 19. The number of commodities to be displayed is calculated based on the count value n. For example, the number of commodities to be displayed is the number after the count value n is increased by 70%. How to set the number of commodities to be displayed is arbitrary.

The processor 11 notifies the communication interface 14 to send a commodity display notification command to the information terminal 30 as ACT 20. In response to the notification, a commodity display notification command is transmitted via the communication interface 14. The commodity display notification command is sent from the access point 40 to the information terminal 30 via the communication network 50. The commodity display notification command includes section identification information of the particular section 71 to be restocked, that is the section 71, where the ratio of display table color to the area of section 71 is at or above the threshold value, and the number of commodities to be displayed in the section 71.

The commodity display notification command transmitted from the image processing apparatus 10 is received by the wireless unit 34 of the information terminal 30. The processor 31 of the information terminal 30 controls the input device 35 to notify the commodity display. Therefore, the input device 35 displays the section identification information included in the commodity display notification command, and the number of commodities to be restocked. In some examples, the processor 31 may notify the clerk of the section identification information and the number of commodities to be restocked by voice via a speaker provided in the information terminal 30.

The clerk who has received the commodity display notification then performs the work of placing new items in the section 71 corresponding to the section identification information. Then, after the clerk has finished the work of restocking commodities and presses a commodity display completion button displayed on the input device 35 of the information terminal 30 or the like.

Once the commodity display completion button is pressed, the processor 31 controls the wireless unit 34 to transmit a commodity display completion command to the image processing apparatus 10. Therefore, the wireless unit 34 wirelessly transmits the commodity display completion command. The commodity display completion command is received by the access point 40 and sent to the image processing apparatus 10 via the communication network 50.

The processor 11 of the image processing apparatus 10 waits for the commodity display completion command from the information terminal 30 in ACT 21. Once the commodity display completion command is received, the processor 11 determines YES in ACT 21 and returns to ACT 11. Thus, the processor 11 repeatedly executes the above-described processing of ACT 11 to ACT 21 for each section 71 over time.

The image processing apparatus 10 is configured a processor 11 that executes the processing of the ACT 12 in FIG. 5. The processor 11 functioning in this manner may be referred to as an acquisition unit or the like. In any event, the image processing apparatus 10 acquires a captured image of a display location where particular commodities are displayed and tracks changes in stock levels based on subsequently captured images.

The processor 11 executes the processing of the ACT 16 as illustrated in FIG. 5. That is, the image processing apparatus 10 calculates the area of the region that appears in the captured images when the commodities are removed from the display location (e.g., display table 70).

The processor 11 executes the processes of ACT 17 and ACT 18 as illustrated in FIG. 5. That is, the image processing apparatus 10 detects a shortage of commodities based on the calculated area of the region that appears in the captured image(s).

The processor 11 executes the processes of ACT 19 and ACT 20 as illustrated FIG. 5. That is, the image processing apparatus 10 provides a notification when a shortage of commodities is detected.

According to the one embodiment, if the area of the display table color exceeds some predetermined threshold value, a shortage of commodities is detected and a store clerk is notified of the shortage. Therefore, the clerk does not have to check for commodity stocking levels, and the work burden on the clerk can be reduced. Since the clerk can be automatically notified of a shortage of commodities before the commodities entirely run out, the clerk can quickly resolve the shortage of the displayed commodities, which leads to an improvement of customer satisfaction and sales since some of each commodity will always present. In the present example, an increase in detected display table color increases is tracked, and the number of commodities to be displayed can be calculated based on the count value n corresponding to expected changes in display table color for remove on an individual commodity item. Thus, the clerk can be notified of the number of commodities that need to be restocked. The clerk is notified of the section identification information for identifying a particular section 71. Therefore, since the clerk can notice the required number of commodities to be displayed and the particular section 71 (section 711 to section 714) of the display table 70 where the commodities need to be displayed, they can perform the work of displaying the commodities more efficiently.

Although an embodiment of an image processing apparatus and an image processing system have been described above, the present disclosure is not limited thereto.

In the above embodiment, the fixed amount by which the display table color is determined to have increased is the minimum value of the area that becomes apparent if one fresh commodity item displayed on the display table 70 is removed. For example, a group of pixels in which similar color information is detected is set as a section 71 for one fresh commodity. Therefore, the fresh commodities displayed in the section 71 may be identified from the color information of the section 71. Then, the fixed amount may be determined for each section 71 from the average size of the fresh commodities therein. The identification of fresh commodities is not limited to the information of the color(s) occupied by the section 71. For example, a label printed with a barcode such as a two-dimensional data code containing information about the displayed fresh commodities may be attached to the display table 70, and an image of the barcode may be captured by the camera 20 to identify the fresh commodities on the display table 70.

In one embodiment, a display table 70 is illustrated. However, the display location need not be a table, the detected display location color may be a surface other than the surface of a display table 70. For example, a wall behind a display location may correspond to table surface in the detection scheme.

In one embodiment, different kinds of fresh commodities are displayed in each section 71. However, in other examples, there may be only one section 71. That is, just one kind of fresh commodity may occupy the entire display table. In such a case, the threshold value for restocking may be a fixed value because the area of the section 71 is constant.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
a camera controller to acquire a camera image of a display location where commodities are displayed;
a communication interface configured to communicate with an information terminal; and
a processor configured to:
calculate an empty area in the camera image corresponding to a portion of the display location that is revealed when commodities are removed from the display location,
detect a shortage in the number of the commodities at the display location based on the calculated empty area, and
send a notification, via the communication interface, to the information terminal when the shortage in the number of the commodities at the display location is detected, wherein
the shortage in the number of the commodities at the display location is detected when a ratio of the calculated empty area to a total area of the display location exceeds a threshold value.

2. The image processing apparatus according to claim 1, wherein the notification includes an estimated number of commodities necessary to restock the display location, the estimated number being based on a value of the calculated empty area.

3. The image processing apparatus according to claim 2, wherein the notification also indicates a position for the display location within a store.

4. The image processing apparatus according to claim 1, further comprising:
a camera connected to the camera controller, the camera being positioned to provide the camera image of the display location.

5. The image processing apparatus according to claim 4, wherein the camera is connected to the camera controller by a dedicated cable.

6. The image processing apparatus according to claim 1, further comprising:
an image memory to store the acquired camera image.

7. The image processing apparatus according to claim 1, wherein
the display location includes a plurality of sub-regions, and
the processor is configured to detect the location of each sub-region of the display location based on color similarity in the captured image.

8. The image processing apparatus according to claim 1, wherein
the display location is a display table, and
the portion of the display location that is revealed when commodities are removed is an upper surface of the display table.

9. A product stocking level monitoring system for a retail store, the system comprising:
an image capture device configured to capture a camera image of a display location at which commodities are displayed in a store; and
an image processing apparatus including:
a camera controller to acquire the camera image from the image capture device;
a communication interface configured to communicate with an information terminal; and
a processor configured to:
calculate an empty area in the camera image corresponding to a portion of the display location that is revealed when commodities are removed from the display location,
detect a shortage in the number of the commodities at the display location based on the calculated empty area, and
send a notification, via the communication interface, to the information terminal when the shortage in the number of the commodities at the display location is detected.

10. The product stocking level monitoring system according to claim 9, wherein the notification includes an estimated number of commodities necessary to restock the display location, the estimated number being based on a value of the calculated empty area.

11. The product stocking level monitoring system according to claim 10, wherein the notification also indicates a position in the store for the display location.

12. The product stocking level monitoring system according to claim 9, wherein the shortage in the number of the commodities at the display location is detected when a ratio of the calculated empty area to a total area of the display location exceeds a threshold value.

13. The product stocking level monitoring system according to claim 9, wherein
the display location includes a plurality of sub-regions, and
the processor is configured to detect the location of each sub-region of the display location based on color similarity in the captured image.

14. The product stocking level monitoring system according to claim 13, wherein the empty area is calculated for each of the detected sub-regions in turn.

15. A method of controlling an image processing apparatus for product stocking level monitoring, the method comprising:
acquiring a camera image from an image capture device positioned to image a display location for commodities in a store;
calculating an empty area in the camera image corresponding to a portion of the display location that is revealed when commodities are removed from the display location;
detecting a shortage in the number of the commodities at the display location based on the calculated empty area; and
sending a notification, via a communication interface, to an information terminal when the shortage in the number of the commodities at the display location is detected.

16. The method according to claim 15, wherein
the display location is a display table, and
the portion of the display location that is revealed when commodities are removed is an upper surface of the display table.

17. The method according to claim 15, wherein the notification includes an estimated number of commodities necessary to restock the display location, the estimated number being based on a value of the calculated empty area.

18. The method according to claim 17, wherein the notification also indicates a position in the store for the display location.

19. An image processing apparatus, comprising:
a camera controller to acquire a camera image of a display location where commodities are displayed;
a communication interface configured to communicate with an information terminal; and
a processor configured to:
calculate an empty area in the camera image corresponding to a portion of the display location that is revealed when commodities are removed from the display location,
detect a shortage in the number of the commodities at the display location based on the calculated empty area, and
send a notification, via the communication interface, to the information terminal when the shortage in the number of the commodities at the display location is detected, wherein
the display location includes a plurality of sub-regions, and
the processor is configured to detect the location of each sub-region of the display location based on color similarity in the captured image.

20. The image processing apparatus according to claim 19, wherein the empty area is calculated for each of the detected sub-regions in turn.

* * * * *